(12) United States Patent
Yamauchi (10) Patent No.: US 6,179,083 B1
(45) Date of Patent: Jan. 30, 2001

(54) STEERING APPARATUS FOR VEHICLE

(75) Inventor: Yoji Yamauchi, Toyota (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/182,511

(22) Filed: Oct. 30, 1998

(30) Foreign Application Priority Data

Nov. 14, 1997 (JP) .................................................... 9-313867
Oct. 22, 1998 (JP) .................................................. 10-300981

(51) Int. Cl.$^7$ ...................................................... B62D 5/04
(52) U.S. Cl. ............................................ 180/444; 180/443
(58) Field of Search .................................... 180/444, 443; 74/388 PS; 475/228, 229, 153, 329

(56) References Cited

U.S. PATENT DOCUMENTS

| 3,286,548 | * | 11/1966 | Baker | 74/626 |
|---|---|---|---|---|
| 3,404,584 | * | 10/1968 | Trautmann | 74/687 |
| 3,427,899 | * | 2/1969 | Gunderson et al. | 74/687 |
| 3,511,104 | * | 5/1970 | Piat | 74/388 PS |
| 4,530,413 | * | 7/1985 | Buike et al. | 180/444 |
| 4,765,425 | * | 8/1988 | Saito et al. | 180/444 |
| 4,973,295 | * | 11/1990 | Lee | 475/153 |

FOREIGN PATENT DOCUMENTS 62-23869  1/1987 (JP) .
62-238166 10/1987 (JP) .

* cited by examiner

Primary Examiner—J. J. Swann
Assistant Examiner—Michael Cuff
(74) Attorney, Agent, or Firm—Oliff & Berridge, PLC (57) ABSTRACT

A planetary gear mechanism is constructed of sun gear, planetary gears, and ring gear. The planetary gears are fixed to a carrier integral with an input shaft. The output shaft is coupled to the ring gear. The transmission ratio can be changed by rotating the sun gear through the worm wheel and worm gear, and agreement is achieved between rotating directions of the input shaft and output shaft.

2 Claims, 8 Drawing Sheets

STEERING APPARATUS FOR VEHICLE

BACKGROUND OF THE INVENTION

1. Field of the Invention

The present invention relates to a steering apparatus for a vehicle having a variable transmission ratio of a steer angle of turned wheels to a steering angle of a steering wheel.

2. Related Background Art

In the comparative steering apparatus, rotation of a steering shaft coupled to the steering wheel is normally converted to lateral displacement of a tie rod through a gearing system such as rack and pinion. In order to assure running stability according to vehicle speed on this occasion, the apparatus is provided with a transmission ratio changing mechanism for changing a rotation transmission ratio (gear ratio) between input and output of the gearing system in accordance with vehicle speed.

Figure 9:
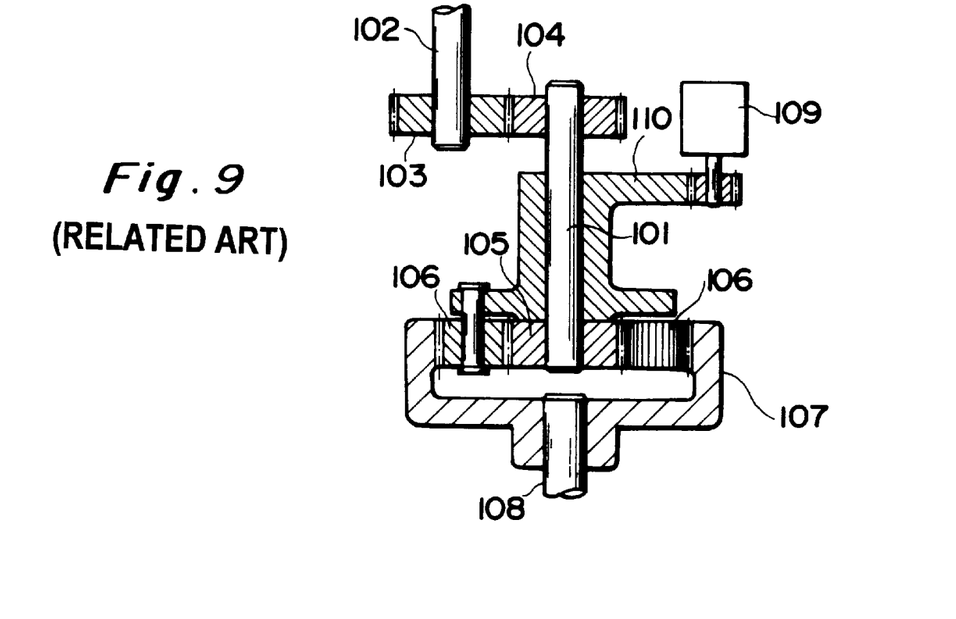
FIG. 9 is a sectional view to show the comparative steering apparatus for vehicle.

FIG. 9 illustrates an example of the comparative steering apparatus provided with such a transmission ratio changing mechanism which is similar to a mechanism described in Japanese Laid-open Patent Application No. 62-23869. In this steering apparatus, rotation of steering shaft 102 coupled to the steering wheel is transmitted through input gears 103, 104 to input shaft 101, whereby the input shaft 101 rotates in unison with sun gear 105. The rotation of the sun gear 105 is transmitted through planetary gears 106, disposed on the outside periphery of the sun gear, to ring gear 107, and the apparatus is structured to gain rotational output from output shaft 108 which is integral with the ring gear 107.

On the other hand, rotation of stepping motor 109 is transmitted to carrier 110, which is rotatable relative to the input shaft 101, and the carrier 110 supports the planetary gears 106.

In this setup, when the carrier 110 is rotated by the stepping motor 109, the planetary gears 106 come to revolve around the sun gear 105. This action changes an amount of rotation of the planetary gears 106 rotated by the sun gear 105. The rotation transmission ratio between the input shaft 101 and the output shaft 108 is controlled by this mechanism.

SUMMARY OF THE INVENTION

Figure 10:
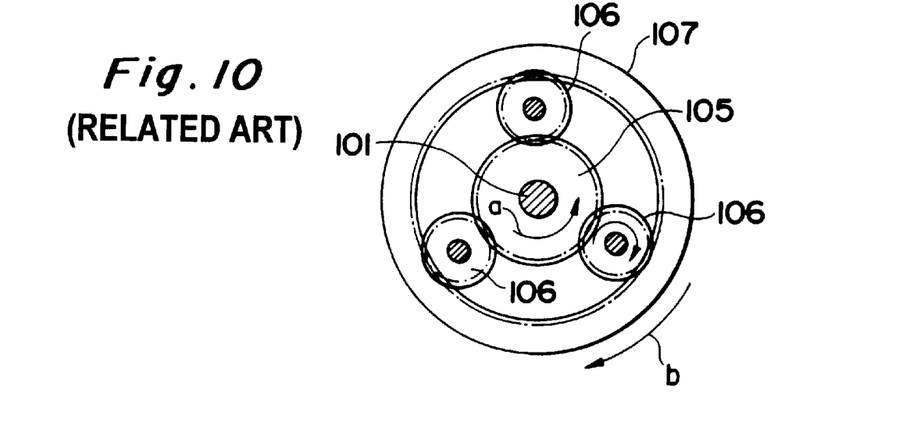
FIG. 10 is a plan view to show only the planetary gear mechanism extracted from the comparative steering apparatus for vehicle.

In the comparative steering apparatus, as shown in FIG. 10, when the input shaft 101 rotates in the direction of arrow a, this rotation is transmitted through the sun gear 105 and the planetary gears 106 to the ring gear 107, but the ring gear 107 rotates in the direction of arrow b, which is opposite to the arrow a. In order to achieve agreement between the rotating direction of the steering wheel and the rotating direction of the output shaft 108, it was necessary to transmit the rotation of the steering shaft 102 while reversing it accordingly. For this purpose, it was necessary to interpose a pair of input gears 103, 104 for transmission with reversal of the rotation of the steering shaft 102 on the input side, and they were thus hindered against miniaturization of the steering apparatus.

The present invention has been accomplished to solve this problem and an object of the invention is to provide a steering apparatus for a vehicle that can contribute to miniaturization of the steering apparatus.

A steering apparatus for a vehicle according to the present invention is a steering apparatus for a a vehicle having a variable transmission ratio of an angle of a turned wheel to an angle of a steering wheel, the steering apparatus comprising: an input shaft arranged to rotate in the same direction as the steering wheel does, in conjunction with a rotating operation of the steering wheel; a sun gear disposed concentrically with the input shaft and being capable of being driven to rotate; a planetary gear coupled to the input shaft and arranged to revolve in the same direction as the input shaft does, around the sun gear while being kept in mesh with the sun gear; a ring gear of an annular shape whose inside periphery is in mesh with the planetary gear; and an output shaft arranged to rotate in unison with the ring gear.

With rotation of the input shaft, the planetary gear coupled to this input shaft revolves around the sun gear in the same direction as the input shaft. With the revolving motion of the planetary gear around the sun gear, the ring gear in mesh with the planetary gear is rotated in the same direction as the revolving direction of the planetary gear, whereby the output shaft is rotated in this direction. Therefore, agreement is achieved between the rotating directions of the input shaft and the output shaft.

Rotation of the sun gear changes the rotation amount (angle of rotation) of the planetary gear and in turn also changes the rotation amount of the ring gear. This action can change the rotation transmission ratio of the output shaft to the input shaft.

The steering apparatus for vehicle may comprise: a transmission gear disposed concentrically with the input shaft and driven to undergo rotation by a driving source, thereby transmitting the rotation to the sun gear; first fixing means for fixing the sun gear and transmission gear relative to the input shaft so as to inhibit movement thereof along an axial direction of the input shaft and permit rotation thereof relative to the input shaft; a support member comprised of carrier 1) for supporting the planetary gear; and second fixing means for fixing the support member relative to the input shaft.

The second fixing means is comprised, for example, of an abutment portion formed between the input shaft and the support member so as to inhibit movement of the support member along the axial direction of the input shaft, and a pushing portion for pushing the support member toward the abutment portion.

In this way the first fixing means fixes the sun gear and transmission gear relative to the input shaft, while the second fixing means, different from the first fixing means, fixes the support member relative to the input shaft. Accordingly, the second fixing means can fix the support member relative to the input shaft, independent of the fixing mechanism of the first fixing means, whereby axial positioning of the support member relative to the input shaft can be carried out independently, which increases degrees of freedom of positioning in assembling operation of the support member.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

An embodiment of the present invention will be described by reference to the accompanying drawings.

Figure 1:
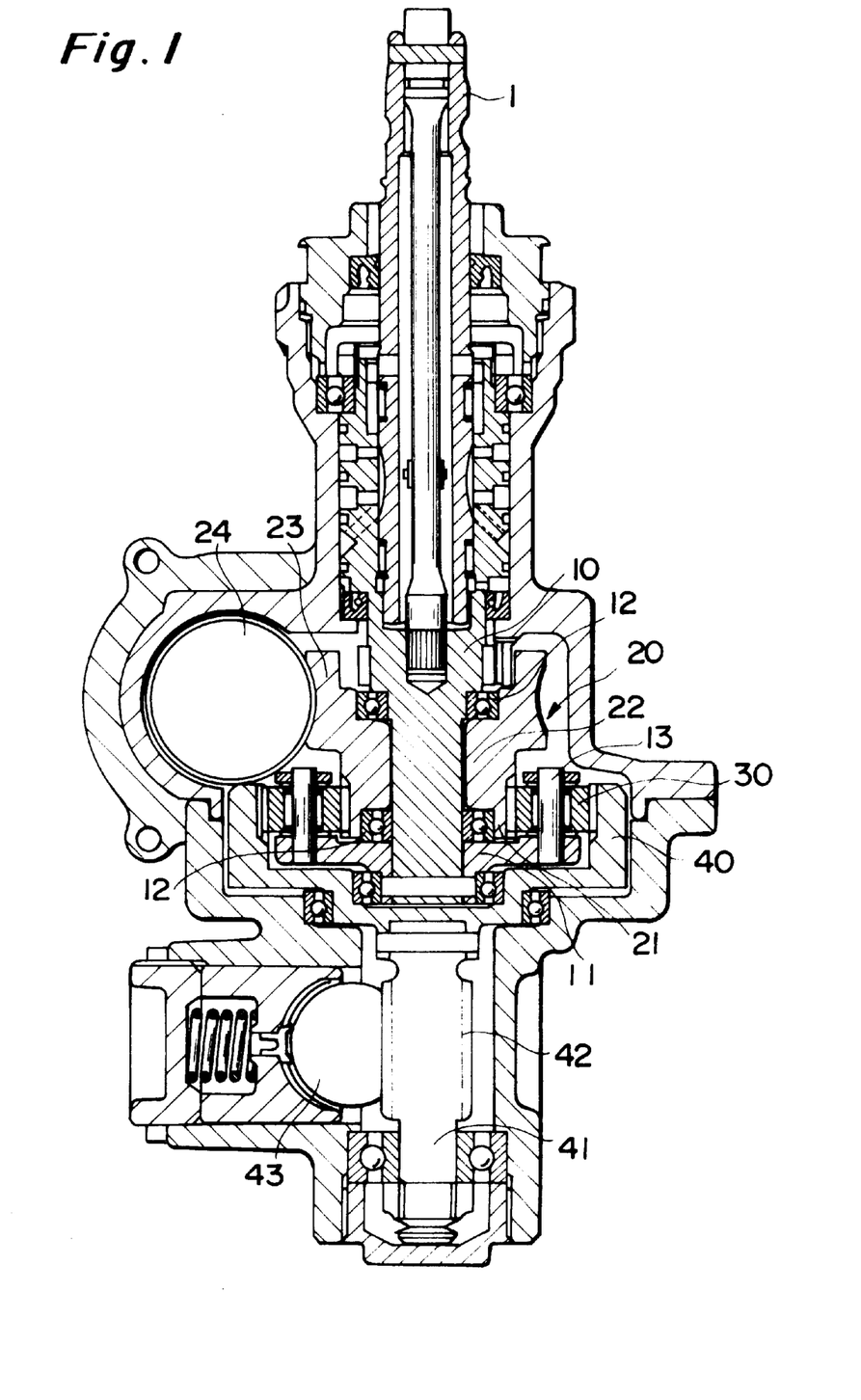
FIG. 1 is a sectional view to show the structure of the steering apparatus for vehicle according to the present embodiment.
Figure 2:
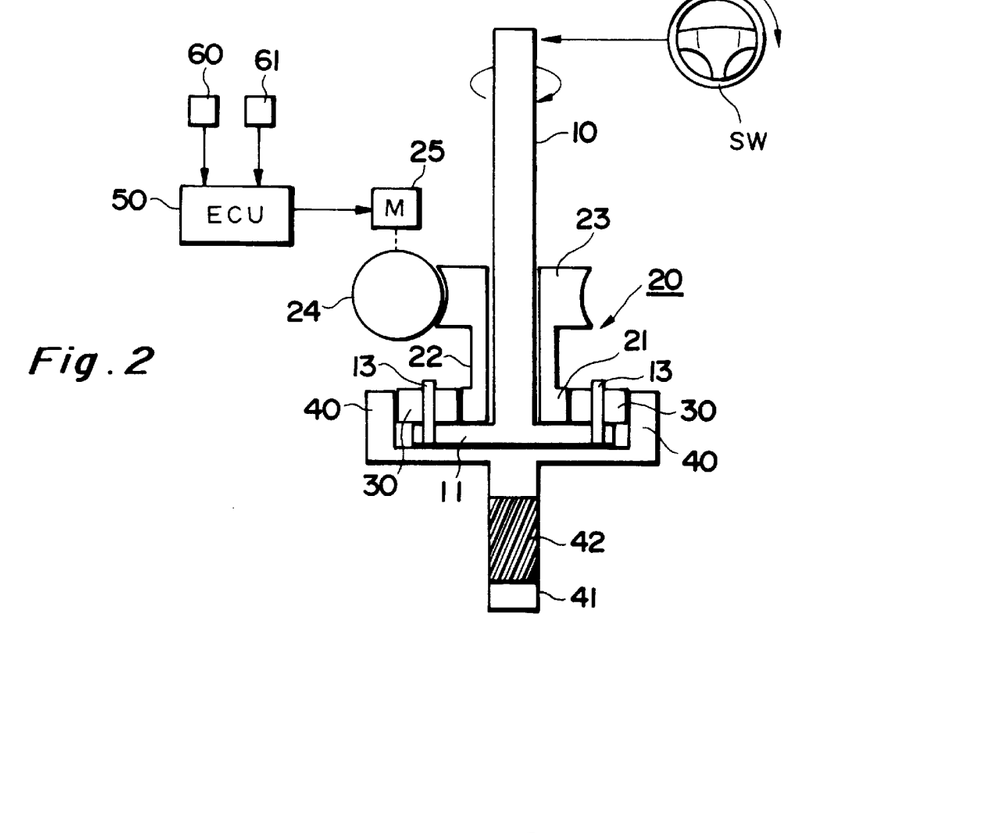
FIG. 2 is a schematic diagram to show the major part of the steering apparatus for vehicle according to the present embodiment.

FIG. 1 and FIG. 2 illustrate a steering apparatus according to the present embodiment.

The input shaft 10 is coupled at the upper end thereof to the steering shaft 1. Steering shaft 1 is coupled to steering wheel SW as shown in FIG. 2. This is a mechanism for rotating the input shaft 10 in the same direction as the steering wheel does.

The input shaft 10 penetrates the inside of a cylindrical sleeve body 20, and the sleeve body 20 is an integral body including a sun gear 21 of an annular shape formed at one end of sleeve 22 and a worm wheel 23 of an annular shape formed at the other, which is arranged on a concentric basis with the input shaft 10. Bearings 12 are interposed between the outside stepped periphery portion of the input shaft 10 and the inside periphery of the sleeve body 20 (see FIG. 1), thus composing a first fix means for securing the transmission and sun gears in axial direction and a mechanism for separately rotating the input shaft 10 and the sleeve body 20 without being bound by each other.

A carrier 11 serving as a support member of a disk shape having an outside diameter larger than the sun gear 21 is fixed at the penetration of the end of the input shaft 10 passing through the sleeve body 20 and into the carrier. Three support pins 13 are fixed at equal intervals in the peripheral region of the carrier 11 and each support pin 13 supports a planetary gear 30 in a rotatable state. These three planetary gears 30 are each in mesh with the sun gear 21 located in the central part, thus composing a mechanism for revolving each planetary gear 30 around the sun gear 21 while keeping them in mesh with the sun gear 21 when the carrier 11 rotates in unison with the input shaft 10.

Figure 3:
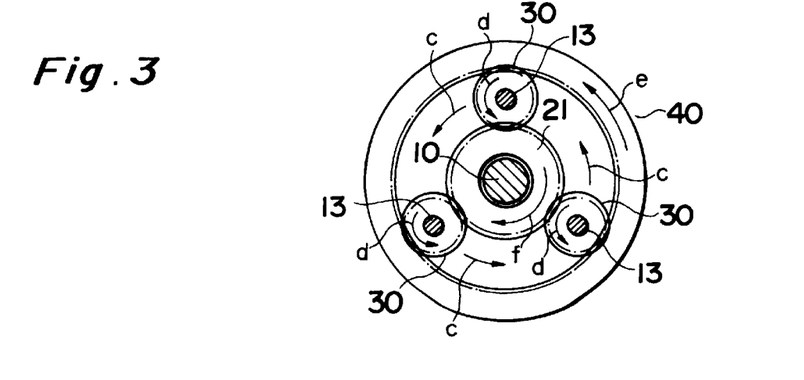
FIG. 3 is a plan view to show only the planetary gear mechanism extracted from the steering apparatus for vehicle.

A ring gear 40 of an annular shape is disposed so as to surround each planetary gear 30 and gear teeth formed in the inside periphery of the ring gear 40 are in mesh with each planetary gear 30. Accordingly, the sun gear 21, planetary gears 30, and ring gear 40 are arranged concentrically as shown in FIG. 3, the sun gear 21 and each planetary gear 30 are in mesh with each other, and each planetary gear 30 and the ring gear 40 are in mesh with each other, thus composing a planetary gear mechanism.

The ring gear 40 is integral with the output shaft 41 and a rack shaft 43 (see FIG. 1) is in mesh with pinion 42 formed in the output shaft 41. This rack-and-pinion mechanism converts rotational motion of the output shaft 41 to translational motion of the rack shaft 43, thus composing a mechanism for turning the wheels.

On the other hand, a worm gear 24 is in mesh with the worm wheel 23 forming the sleeve body 20, and this worm gear 24 is structured to be rotationally driven by driving motor 25. An electronic control unit (ECU) 50 carries out control of rotation of the driving motor 25 according to a steering direction and vehicle speed, based on detection results of vehicle speed sensor 60 and steering angle sensor 61.

Now, the operation of each gear will be described.

When a driver rotates the steering wheel, this rotation is transmitted through the steering shaft 1 to the input shaft 10, whereby the input shaft 10 rotates in the same direction as the steering wheel does. On this occasion, the carrier 11 also rotates in unison with the input shaft 10, so that each support pin 13 supported on the carrier 11 also revolves around the sun gear 21.

For example, supposing the support pins 13 move in the direction indicated by arrow c in FIG. 3, the movement of each support pin 13 causes each planetary gear 30 supported by this support pin 13 to move along the direction of arrow c around the sun gear 21 while rotating in the direction indicated by arrow d about the support pin 13. When the planetary gears 30 rotate in the direction of arrow d, the ring gear 40 in mesh with the planetary gears 30 rotates in the direction of arrow e, so that the output shaft 41 rotates in this direction. Therefore, the rotation of the input shaft 10 is transmitted to the output shaft 41 in the same direction and the output shaft 41 comes to rotate in the same direction as the input shaft 10 does.

When the driver rotates the steering wheel in the opposite direction, each gear rotates or moves in the opposite direction to the arrows shown in FIG. 3, so that agreement is also achieved similarly between the rotating direction of the input shaft 10 and the rotating direction of the output shaft 41 in this case.

On the other hand, when the driving motor 25 rotates the worm gear 24, this rotation is transmitted through the worm wheel 23 to the sleeve body 20, thereby rotating the whole of the sleeve body 20. Namely, the sleeve body 20 is driven to rotate in the direction according to the rotating direction of the worm gear 24. Therefore, the sun gear 21 forming the sleeve body 20 also rotates, whereby the rotation of the sun gear 21 changes the rotation amount of each planetary gear 30 in mesh with the sun gear 21.

For example, when the planetary gears 30 move in the direction of arrow c in conjunction with the steering operation and when the sun gear 21 is rotated in the direction of arrow f of FIG. 3, this results in increasing the rotation amount of the planetary gears 30 rotating in the direction of arrow d and also increasing the rotation amount of the ring gear 40 in mesh with the planetary gears 30. When the sun gear 21 rotates in the opposite direction to the arrow f of FIG. 3, the rotation amount of the planetary gears 30 is decreased and the rotation amount of the ring gear 40 is also decreased.

When the rotation control of the sun gear 21 is carried out as described above, the rotation transmission ratio (gear ratio), at which the rotation of the input shaft 10 is transmitted to the ring gear 40, can be changed. This control of rotation of the sun gear 21 is performed by the ECU 50 as described above, so as to carry out the control of rotation of the driving motor 25 according to the steering direction and vehicle speed.

Figure 4:
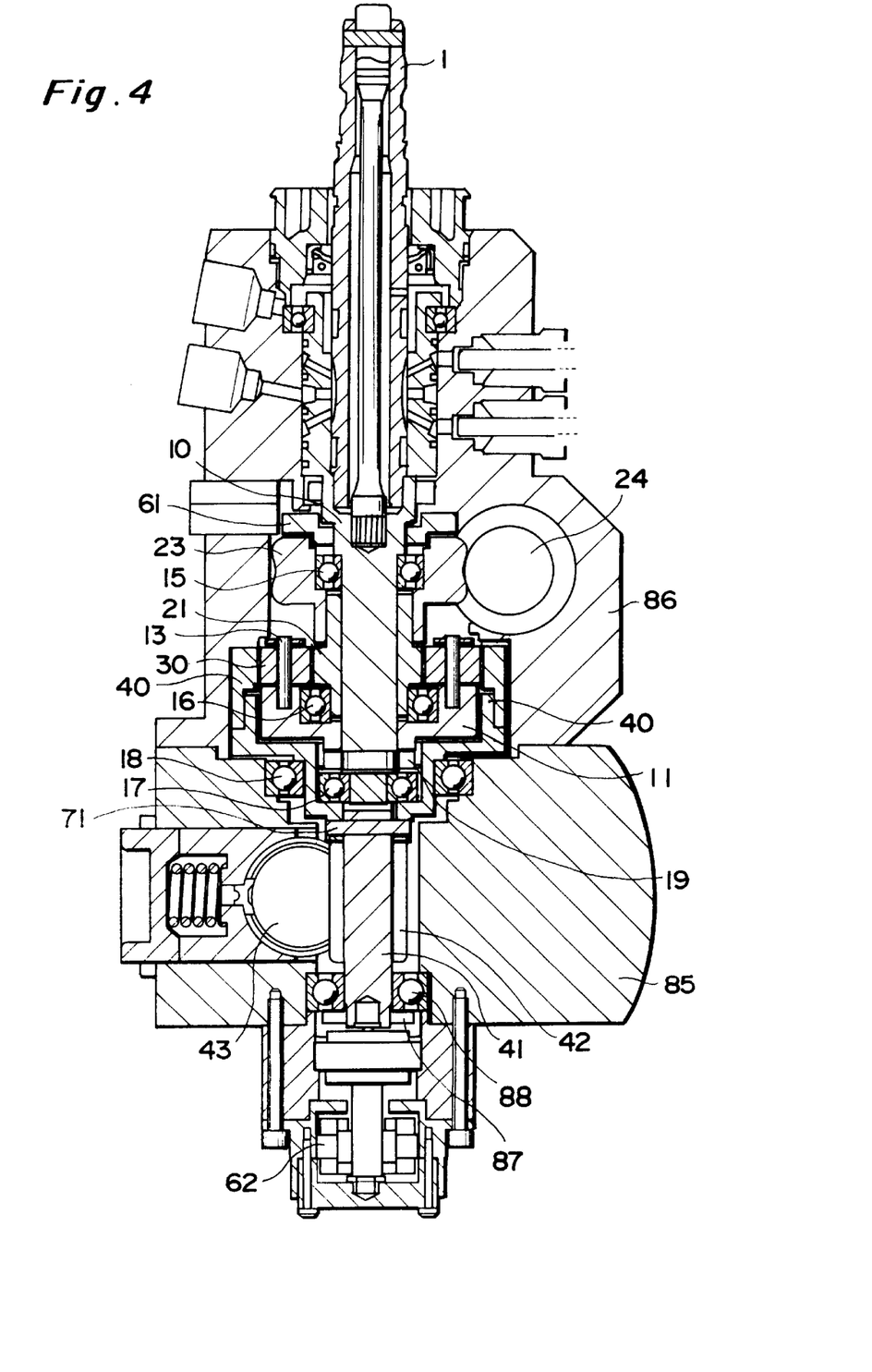
FIG. 4 is a sectional view to show the structure of a steering apparatus for vehicle according to another embodiment.

Next, another embodiment is illustrated in FIG. 4. Members having the same functions as those in the steering apparatus of FIG. 1 are denoted by the same reference numerals.

This steering apparatus is provided with a steering angle sensor 61 for detecting an angle of rotation of the input shaft 10 over a worm wheel 23 and with a resolver 62 for detecting an angle of rotation of the output shaft 41 below the output shaft 41. The worm wheel 23 and sun gear 21 are coupled to each other when assembled via a first fixing means comprising bearings 15 and 16, steering sensor ring 61 and the stepped portion of the input shaft together with a second means comprising bearings 17 and 18, and nut 19, thereby composing a mechanism to rotate the worm wheel 23 and sun gear 21 in unison while inhibiting the axial movement thereof.

An example of assembling of the planetary gear mechanism in the steering apparatus of FIG. 4 will be described below referring to FIG. 4 and FIG. 5.

First, the ring shaped steering angle sensor 61 is lifted up via the lower end of input shaft 10 and is pressed into position encircling input shaft 10 at the illustrated position and fixed thereon. Then the upper part of the sun gear 21 is pressed into the lower part of the worm wheel 23 and these parts are overlapped. The overlapped parts are fixed and locked together by inserting a coupling pin 72 through these parts, the relative rotational movement between these parts being minimized or eliminated. Note that in place of coupling pin 72, these parts may be fixed by using a key coupling that provides a key groove and a key fitting the groove, the respective key groove and key being provided on the respective parts.

Next, the ring shaped angular contact ball bearing 15 is affixed to worm wheel 23 by pressing bearing 15 into the inner upper part of worm wheel 23. The whole of the gear assembled in such a manner is inserted from the lower part of input shaft 10. Angular contact ball bearing 15 is pressed thereonto until the inner ring of angular contact ball bearing 15 abuts against step portion 10a formed on input shaft 10 for positioning.

Next, an angular contact ball bearing 16 of the ring shape is pressed into an aperture of the carrier 11 carrying the planetary gears 30 to be fixed there, and the carrier 11 in this state is slid up from the lower end of the input shaft 10. This causes the inner ring of the angular contact ball bearing 16 to be pressed onto the lower part of the sun gear 21 and also causes the planetary gears 30 to be coupled to the sun gear 21.

Near the fixing position of the carrier 11 which serves as a support member, thread grooves are cut in the peripheral part of the input shaft 10. When a nut 19 of the ring shape is moved up from the lower end of the input shaft 10 to near the illustrated position and is tightened up, the nut 19 pushes the carrier 11 upward. This pushing force is transmitted via the carrier 11 to the angular contact ball bearing 16, to the sun gear 21, and to the worm wheel 23 to act on the angular contact ball bearing 15 positioned by the step portion 10a. Accordingly, tightening of the nut 19 results in fixing the members located between the nut 19 and the angular contact ball bearing 15 in position.

After this, deep groove ball bearing 17 is pressed and fixed onto the center of ring gear 40. Ring gear 40 is composed of base portion 40b that is fixed to the input shaft 10 side and ring shaped gear portion 40a. Gear portion 40a is pressed onto base portion 40b partially overlapping one another. Coupling pin 73 penetrates through these overlapped portions fixing and locking these parts to each other, the relative rotational movement of these parts being eliminated or minimized. Ring gear 40 is attached with the output shaft 41 while the relative rotational movement is restricted by a coupling pin 71.

This structure may be assembled, for example, by first fixing angular contact ball bearing 18 and angular contact ball bearing 88 to lower housing 85. Then, form an intermediate unit by assembling and integrating ring gear 40, deep groove ball bearing 17 and output shaft 41. Next, insert the intermediate unit into lower housing 85 and fitted into the inner rings of angular contact ball bearing 18 and angular contact ball bearing 88. After the insertion, the intermediate unit is fixed to lower housing 85 by fastening nut 87.

Upper housing 86 with all its gears except for ring gear 40 is mounted on input shaft 10 and is joined to lower housing 85 assembled in the above manner. These steps cause ring gear 40 and planetary gear 30 to mesh with each other.

When assembled in this way, the worm wheel 23 and sun gear 21 are structured so as to be rotatably supported between the angular contact ball bearing 15 fixed to the input shaft 10 and the angular contact ball bearing 16 fixed to the carrier 11.

Although not illustrated, either one of the carrier 11 and input shaft 10 is provided with a key extending in the axial direction while the other is provided with a key groove to fit this key. When the key is fitted in the key groove, relative rotation between them is inhibited about the input shaft 10.

Carrier 11 and input shaft 10 are fixed by tightening nut 19, and their axial positions are defined by the distance in the axial direction from angular contact ball bearing 15 to carrier 11 separated by worm wheel 23, sun gear 21, and angular contact ball bearing 16. But since the angular contact ball bearings 15, 16 are not completely rigid, the relative position of carrier 11 and input shaft 10 are displaceable along the axial direction.

Figure 6:
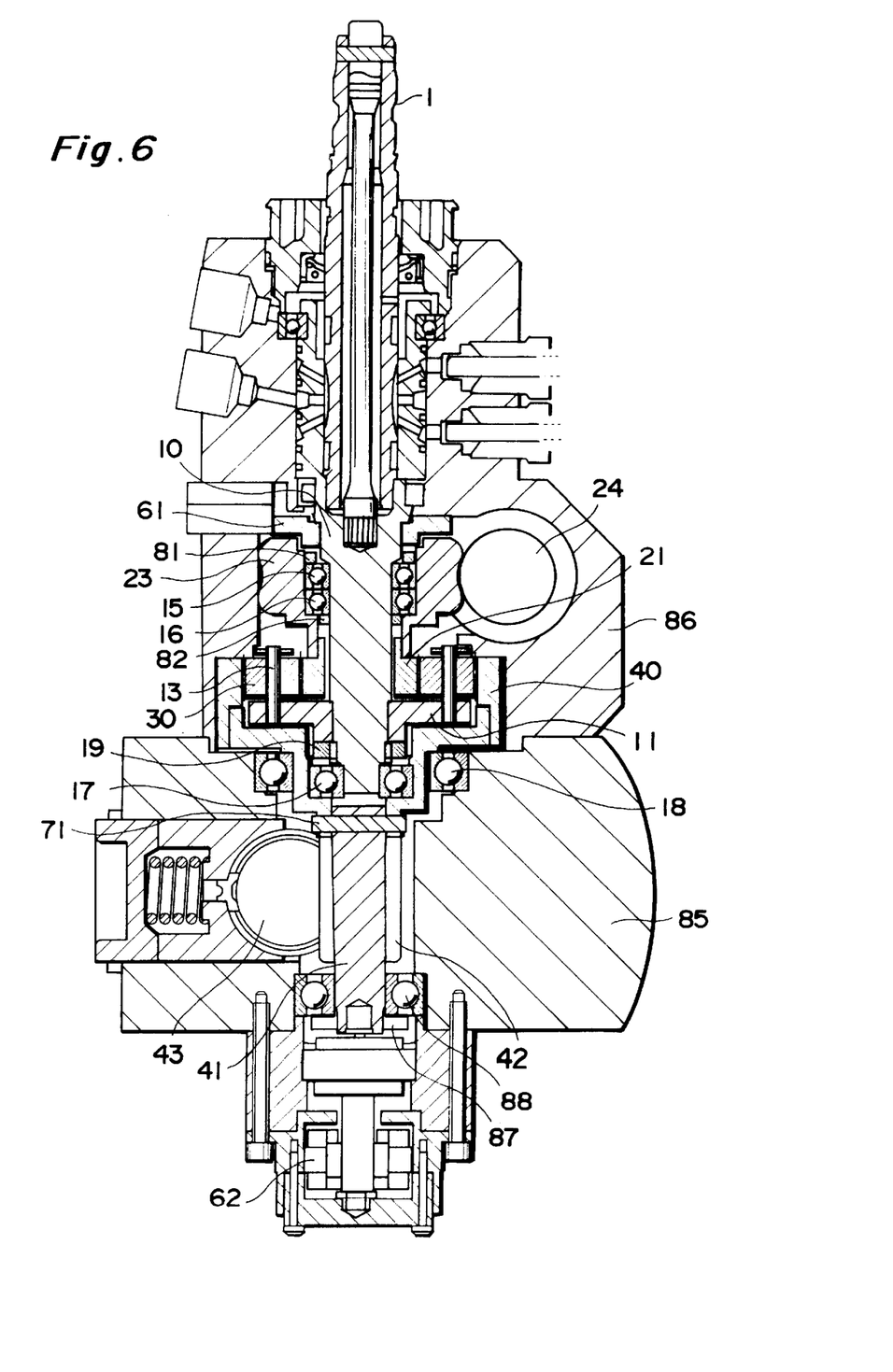
FIG. 6 is a sectional view to show the structure of a steering apparatus for vehicle according to another embodiment.

Further, another embodiment is illustrated in FIG. 6. Members having the same functions as those illustrated in FIG. 4 are denoted by the same reference numerals.

Principal changes from the embodiment illustrated in FIG. 4 are that the angular contact ball bearings 15, 16 are used in the back-to-back mounting structure and that, according to this change, the fixing mechanism of the carrier 11 is also changed.

An example of assembling of the planetary gear mechanism in the steering apparatus of FIG. 6 will be described referring to FIG. 6 and FIG. 7.

First, the steering angle sensor 61 of the ring shape is brought up from the lower end of the input shaft 10 to be pressed onto and fixed on the peripheral part of the input shaft 10 at the illustrated position.

The outer rings of the angular contact ball bearings 15, 16 in the back-to-back mounting state are pressed into the aperture of worm wheel 23. On this occasion, they are pressed into the aperture until the angular contact ball bearing 16 located below abuts against a step portion 23a formed in the aperture of the worm wheel 23. A nut 81 of the ring shape is tightened to be meshed with thread grooves formed in the aperture of the worm wheel 23 before this nut 81 abuts against the angular contact ball bearing 15 located above.

Then the worm wheel 23 mounted with the angular contact ball bearings 15, 16 and nut 81 in this way is slid upward from the lower end of the input shaft 10 to be pressed thereonto until the inner ring of the angular contact ball bearing 15 abuts against the step portion 10a of the input shaft 10, and it is fixed at that position.

Near this fixing position, thread grooves are cut in the peripheral part of the input shaft 10. A nut 82 of the ring shape is guided from the lower end of the input shaft 10 up to near the illustrated position and then is tightened up. As a result, the angular contact ball bearings 15, 16 come into contact with the step portion 10a and nut 81 at the upper part thereof in the axial direction of the input shaft 10 and into contact with the nut 81 and step portion 23a at the lower part thereof. Therefore, the worm wheel 23 is fixed relative to the input shaft 10 via a first fixing means comprising bearing 15 and 16, the stepped portion of the input shaft 10, and nuts 81, 82 and 83 so as to inhibit its movement along the axial direction of the input shaft 10 and permit rotation relative to the input shaft 10.

By using the angular contact ball bearings 15, 16 of the back-to-back mounting structure and the nuts 81, 82 as described above, the worm wheel 23 can be fixed separately relative to the input shaft 10 while the fixing position is not restricted by the other components.

Then the sun gear 21 is guided up from the lower end of the input shaft 10 and the upper part of the sun gear 21 is pressed into the lower inside of the worm wheel 23. As a result, serrations formed in the overlap portion between them are coupled to each other, so that the worm wheel 23 and sun gear 21 are coupled to each other, thus composing the integrally rotatable structure.

Then the carrier 11 serving as a member for the planetary gears 30 is brought from the lower end of the input shaft 10. On this occasion, the input shaft 10 has a step portion 10b with such a peripheral part having decreasing diameters as to abut against the carrier 11 guided along the axial direction of the input shaft 10, and the carrier 11 is thus brought into contact with this step portion 10b. Therefore, this step portion 10b determines the fixing position in the axial direction relative to the input shaft 10.

Near the mounting position of the carrier 11, thread grooves 10c are cut in the peripheral part of the input shaft 10. A nut 83 for fixing of the carrier is guided from the lower end of the input shaft 10 thereonto and is tightened up, whereby the carrier 11 comes to be pressed between the step portion 10b and the nut 83 thereby comprising a second fixing means. This action makes the carrier 11 integrally fixed relative to the input shaft 10.

As described, the carrier 11 can be fixed at the position defined by the step portion 10b while the fixing position is not restricted by the other components. By altering the forming position of the step portion 10b, the fixing position of the carrier 11 can be determined independently. As compared with the embodiment of FIG. 4, the mounting position of the angular contact ball bearing 16 is moved up, so that a sufficient mounting space can be secured by the degree of the movement in the region below the carrier 11.

Figure 5:
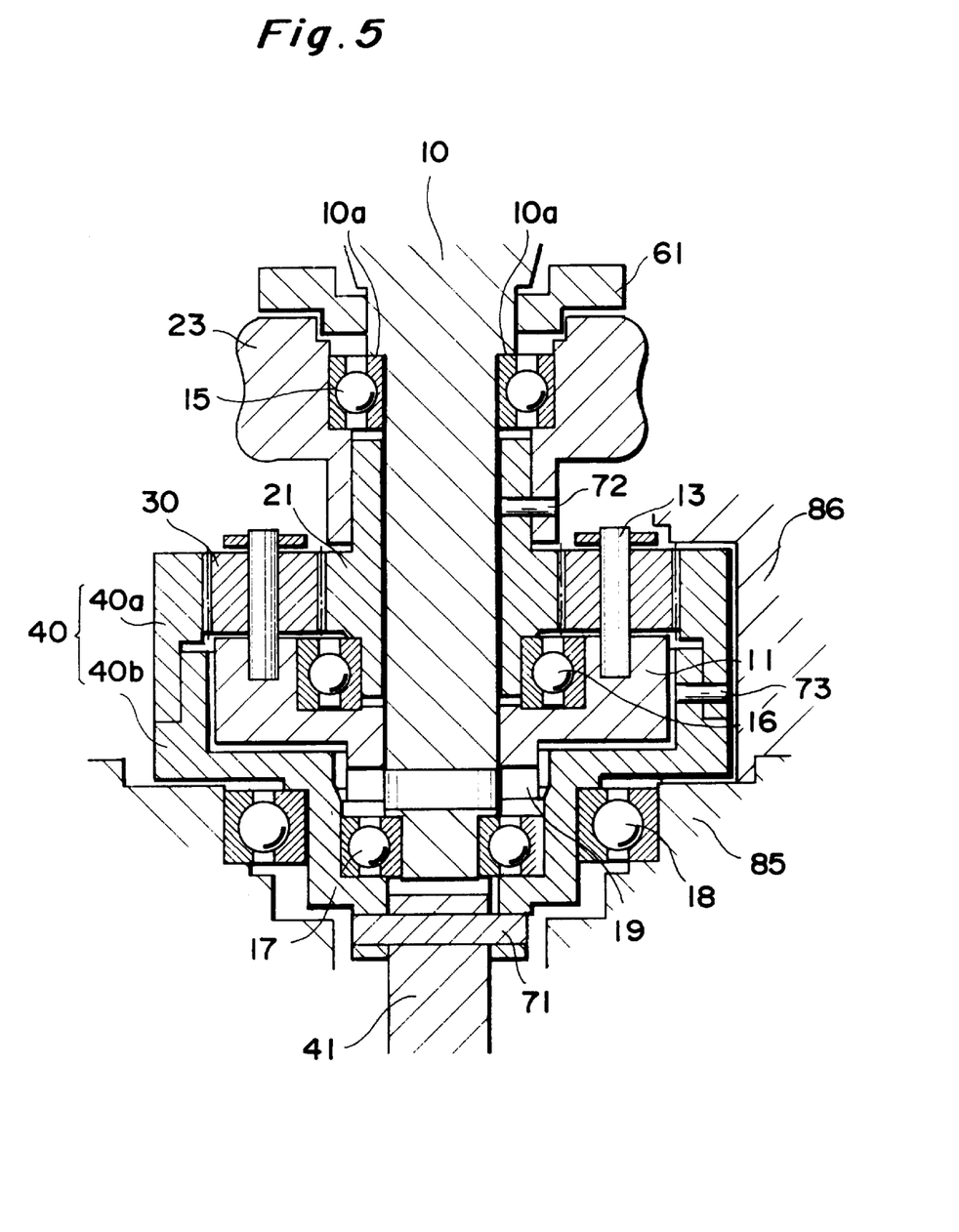
FIG. 5 is a sectional view to show an enlarged view of the major part of FIG. 4.

The assembling operation after this is the same as in the embodiment illustrated in FIG. 4 and FIG. 5 and described previously, and the description thereof is omitted herein.

Figure 7:
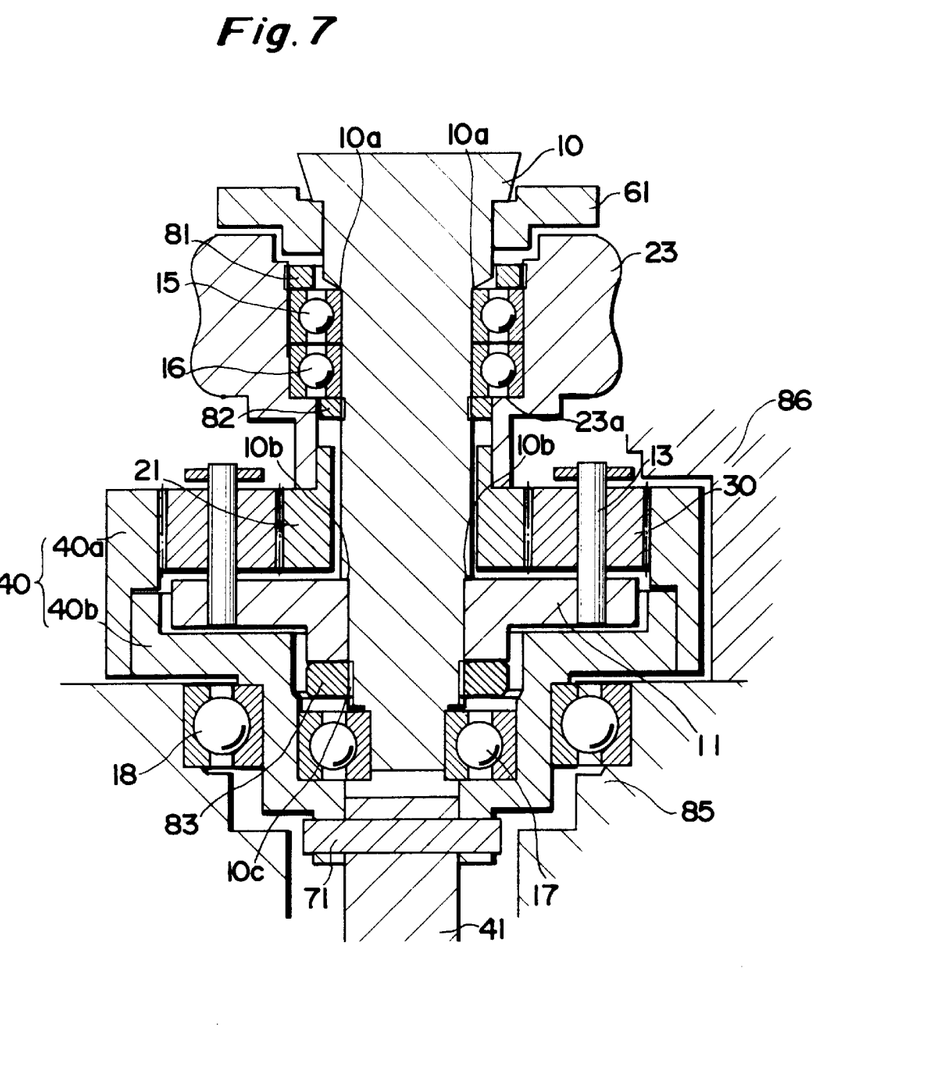
FIG. 7 is a sectional view to show an enlarged view of the major part of FIG. 6.
Figure 8:
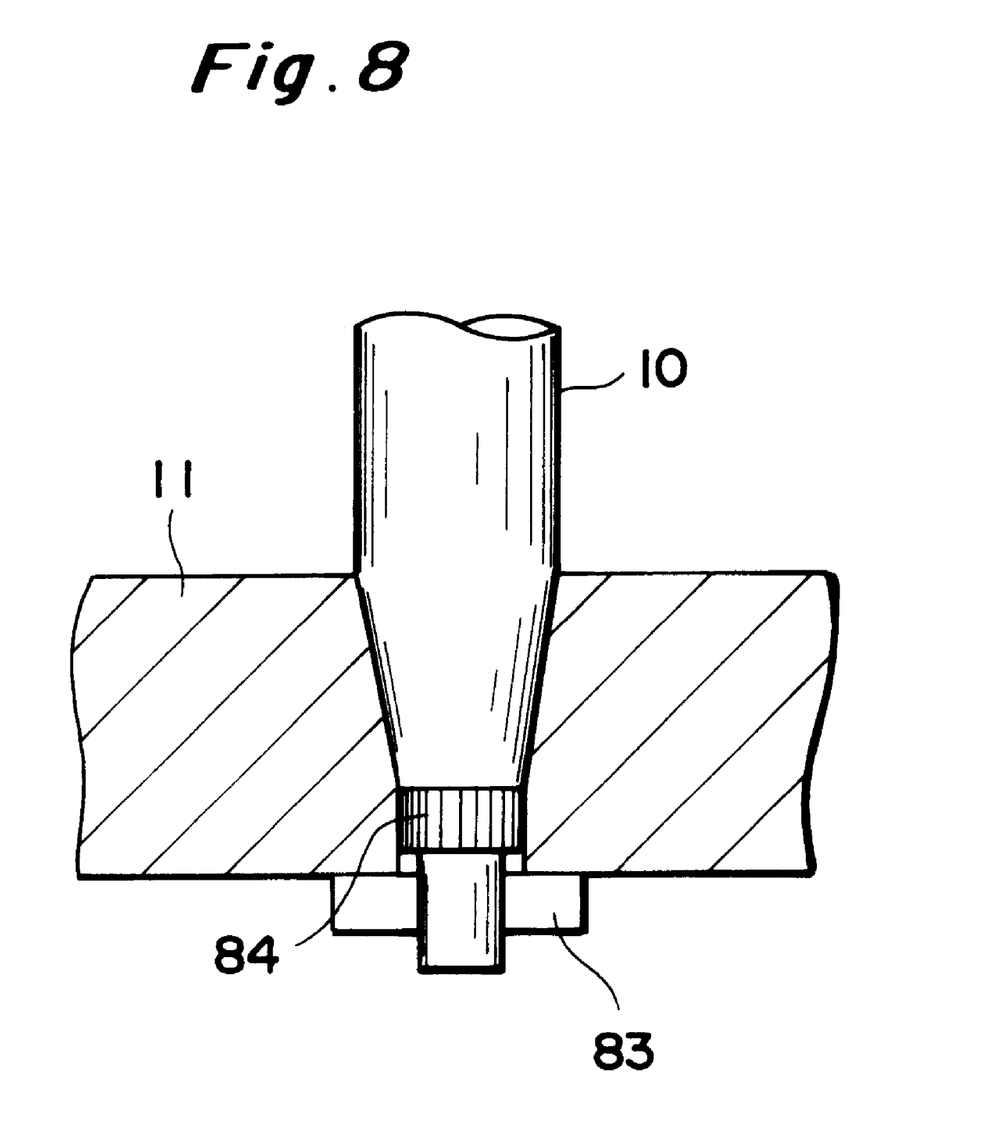
FIG. 8 is a sectional view to schematically show another coupling configuration of the input shaft to the carrier.

The embodiment of FIG. 6 and FIG. 7 described above showed the example where the carrier 11 was positioned by making use of the step portion 10b, and another conceivable configuration is an example as schematically shown in FIG. 8 wherein the lower end portion of the input shaft 10 is tapered with decreasing diameters toward the end and wherein the inside wall of the aperture of the carrier 11 is formed as a taper surface along the taper configuration of the input shaft 10. In this configuration, the carrier 11 can also be fixed relative to the input shaft 10 by bringing the carrier 11 over the input shaft 10 to couple the taper portions of the respective members to each other and thereafter tightening up the nut 83.

In this case, during the tightening process of the nut 83 the carrier 11 is relatively displaced in the axial direction relative to the input shaft 10, but this displacement causes only relative displacement of the meshing parts of the sun gear 21 and ring gear 40 with the planetary gears 30 along the axial direction which is the forming direction of the thread ridges and thread grooves. Therefore, this relative displacement is permitted and the mutual coupling state is not affected at all.

The coupling force of the carrier 11 along the rotating direction of the input shaft 10 can be enhanced by also employing coupling of serrations to each other, the serrations 84 being cut in abutment surfaces of the input shaft 10 and the carrier 11 as illustrated in FIG. 8.

As detailed above, the steering apparatus for vehicle employs the planetary gear mechanism with the sun gear, planetary gears, and ring gear disposed concentrically, wherein the input shaft is coupled to the planetary gears and the output shaft to the ring gear; thus the transmission ratio can be changed by rotating the sun gear and the output can be drawn from the output shaft without reversal of the rotating direction of the input shaft.

This obviates the need for the gears for transmitting the rotation of the input shaft with reversal of the rotating direction as needed before, whereby miniaturization of the steering apparatus can be stepped up further.

Since the steering apparatus for vehicle is provided with the first fixing means for fixing the sun gear and transmission gear relative to the input shaft and the second fixing means for fixing the support member for supporting the planetary gears relative to the input shaft, the support member can be independently fixed relative to the input shaft by the second fixing means, irrespective of the fixing mechanism of the first fixing means. Therefore, the axial positioning of the support member relative to the input shaft can be carried out independently and degrees of freedom for positioning can be increased in assembling of the support member.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering apparatus for vehicle comprising:
   (A) an input shaft axially coupled to a steering shaft disposed to rotate under the control of a steering wheel;
   (B) a sun gear disposed concentrically with said input shaft;
   (C) a ring gear in which said sun gear is arranged;
   (D) planetary gears disposed between and kept in mesh with said sun and ring gears; and
   (E) an output shaft disposed to rotate in unison with said ring gear, wherein the input shaft and the planetary gears are connected so that the input and output shafts rotate in the same direction.

2. A steering apparatus for vehicle according to claim 1, comprising:

a transmission gear disposed concentrically with said input shaft and driven to undergo rotation by a driving source, thereby transmitting said rotation to said sun gear;

first fixing means for fixing said sun gear and said transmission gear relative to said input shaft so as to inhibit movement thereof along an axial direction of said input shaft and permit rotation thereof relative to said input shaft;

a support member for supporting said planetary gears; and second fixing means for fixing said support member relative to said input shaft and providing a degree of axial positioning freedom of the transmission or sun gears along said input shaft.

* * * * *